(12) United States Patent
Ajimi et al.

(10) Patent No.: US 6,419,428 B2
(45) Date of Patent: Jul. 16, 2002

(54) CIRCULAR HOLE CUTTING DEVICES

(75) Inventors: Kunio Ajimi, Higashiosaka; Akihito Uemura, Kasugai, both of (JP)

(73) Assignee: House B.M. Co., Ltd., Osaka (JP)

( * ) Notice: Subject to any disclaimer, the term of this patent is extended or adjusted under 35 U.S.C. 154(b) by 0 days.

(21) Appl. No.: 09/733,895

(22) Filed: Dec. 12, 2000

(30) Foreign Application Priority Data

Feb. 18, 2000 (JP) ........................................ 2000-041598
Jul. 19, 2000 (JP) ........................................ 2000-219284

(51) Int. Cl.[7] ............................. B23C 1/20; B27C 5/00
(52) U.S. Cl. ......................... 409/179; 30/300; 30/310; 144/24
(58) Field of Search ............................. 409/179, 144; 408/111; 30/300, 376, 310, 388; 144/24; 83/490

(56) References Cited

U.S. PATENT DOCUMENTS

| 3,146,675 A | | 9/1964 | Anderson |
| 3,292,494 A | | 12/1966 | Anderson et al. |
| 4,397,593 A | * | 8/1983 | Fordeck ...................... 409/179 |
| 4,759,666 A | * | 7/1988 | Grab ....................... 408/115 B |
| 5,895,183 A | * | 4/1999 | McDaniel ................... 409/179 |

FOREIGN PATENT DOCUMENTS

| DE | 41 25 005 A | 1/1993 |
| DE | 41 25 006 A | 1/1993 |
| JP | 55-29223 U | 3/1980 |
| JP | 57-18088 U | 4/1982 |
| JP | 2521081 U | 12/1996 |

* cited by examiner

Primary Examiner—William Briggs
(74) Attorney, Agent, or Firm—Smith Patent Office

(57) ABSTRACT

A circular hole cutting device (1) for making a circular hole in an object comprises a bit holder (3) which can be attached to a drive shaft of an electric power tool in such a way that the bit holder (3) with a bit (2) attached to a far end of the bit holder (3) rotates together with the drive shaft on a common axis, a cover (4) which is fitted to the bit holder (3) relatively rotatably about its axis, and a radial rod (5) attached to the cover (4) such that the amount of projection of the radial rod (5) in a direction intersecting the bit (2) can be varied. The physical size of the cover (4) is determined such that the bit (2) projects from a far end of the cover (4). The radial rod (5) has a pivot shaft (52) having a pointed end formed by bending a terminal part of the radial rod (5) approximately at right angles.

9 Claims, 14 Drawing Sheets

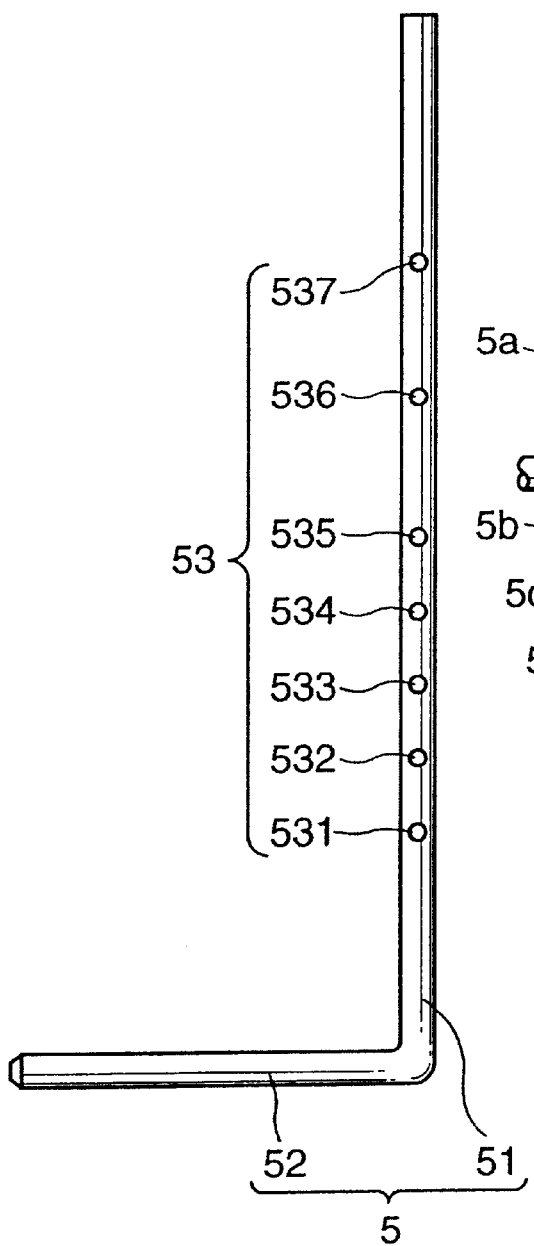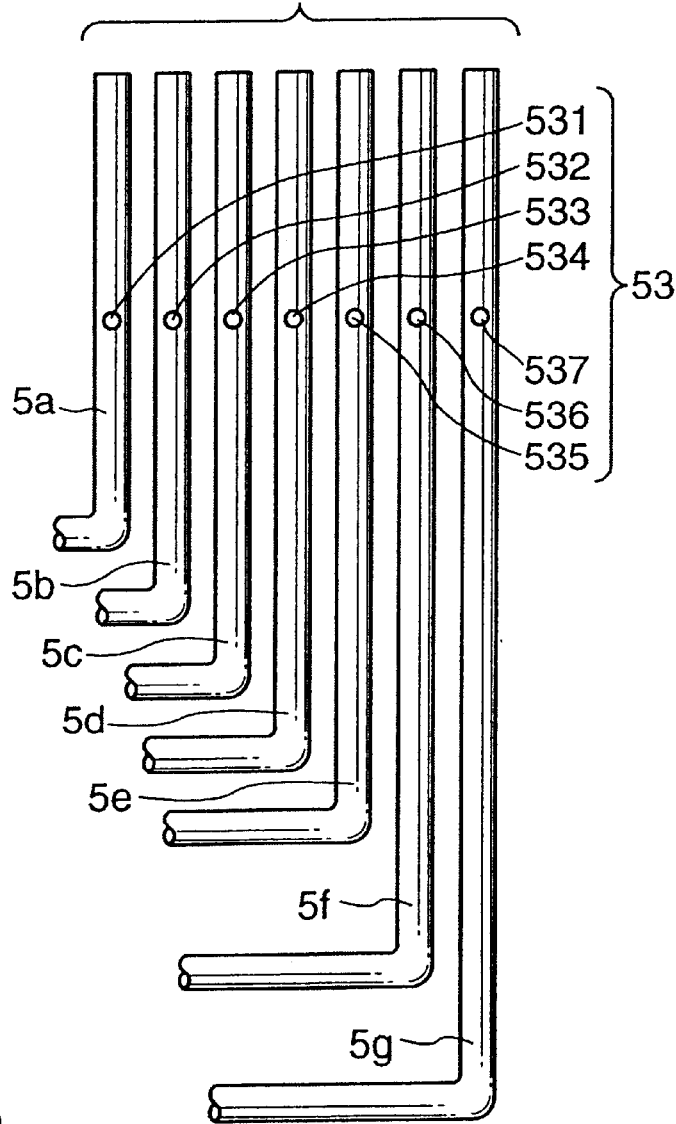

CIRCULAR HOLE CUTTING DEVICES

BACKGROUND OF THE INVENTION

1. Field of the Invention

The present invention relates to circular hole cutting devices which are used for making holes for passing electric wires or water pipes, for instance, in ceilings, walls or floors in a building or house.

2. Description of the Background Art

FIG. 14 shows an example of a conventionally known circular hole cutting device 100. This circular hole cutting device 100 comprises a cylindrical attachment 101, a guide rod 102 passing through the cylindrical attachment 101 at right angles to but at a slight distance from its central axis, and a stopper 103 which is screwed into a curved wall of the cylindrical attachment 101 at right angles to the guide rod 102 in such a way that an extreme end of the stopper 103 comes into contact with the guide rod 102.

The cylindrical attachment 101 is securely attached to an electric power tool 105 as one end of the cylindrical attachment 101 is fitted over a far end of the electric power tool 105 as illustrated. A bit 104 which is turned at high speeds about a central axis of the electric power tool 105 is detachably fitted to its far end. The physical size of the cylindrical attachment 101 is determined such that the bit 104 protrudes to the outside of the cylindrical attachment 101 when the cylindrical attachment 101 is mounted on the electric power tool 105.

The guide rod 102 has a pivot shaft 102a at one end formed by bending a terminal part of the guide rod 102 at right angles to its main part. The extreme end of the pivot shaft 102a is sharply pointed.

The circular hole cutting device 100 thus constructed is used as follows. First, a small center hole is made by the bit 104 at the center of a circular hole to be formed in a ceiling, for instance, operating the electric power tool 105. Then, with the pivot shaft 102a fitted into the center hole, the electric power tool 105 is turned about the pivot shaft 102a while turning the bit 104 at a high speed. As the bit 104 moves in a circle all around the pivot shaft 102a, the ceiling is cut by the bit 104 so that the circular hole for passing an electric wire or a water pipe, for instance, is made therein.

In the conventional circular hole cutting device 100, the cylindrical attachment 101 is mounted on the electric power tool 105 as described above. It is to be noted, however, that different types of electric power tools have different shapes. Accordingly, one problem of the conventional circular hole cutting device 100 is that it lacks flexibility in use due to the need to prepare various cylindrical attachments specially designed for use with different types of electric power tools.

Furthermore, when turning the electric power tool 105 about the pivot shaft 102a, it is necessary to continuously turn the electric power tool 105 about its own axis so that an operator has to change his or her working posture. This poses another problem of the conventional circular hole cutting device 100 that it involves low labor efficiency.

SUMMARY OF THE INVENTION

This invention is intended to solve the aforementioned problems of the prior art. It is therefore an object of the invention to provide a circular hole cutting device featuring high flexibility in use with adaptability to various types of power tools and ease of operation.

According to a principal feature of the invention, a circular hole cutting device which makes a circular hole in an object when turned about a center hole formed in the object comprises a bit holder which can be attached to a drive shaft of an electric power tool in such a way that the bit holder with a bit attached to a far end rotates together with the drive shaft on a common axis, a relatively rotatable part fitted to the bit holder relatively rotatably about the axis of the drive shaft, and a pivot shaft which can be inserted into the center hole formed by the bit, wherein the pivot shaft connected to the relatively rotatable part is located at a position offset from the bit in its radial direction.

With this circular hole cutting device, it is possible to form a circular hole whose radius corresponds to the distance between the bit and the pivot shaft in the object by inserting the pivot shaft in the center hole, activating the electric power tool to turn the bit at a high speed, and slowly turning the electric power tool about the pivot shaft with the bit passing through the object so that the bit turning at the high speed cuts the object along a circular path.

The drive shaft of the electric power tool usually has a chuck complying with industrially standardized dimensional specifications. Therefore, the circular hole cutting device of this invention can be connected to practically any electric power tool regardless of its manufacturer or type, so that the circular hole cutting device provides great flexibility in application.

Furthermore, since the relatively rotatable part and the bit holder are connected relatively rotatably with each other, the relatively rotatable part does not rotate together with the drive shaft of the electric power tool even when the relatively rotatable part is turned about the pivot shaft. Accordingly, it is not necessary for an operator to change his or her working posture to turn the circular hole cutting device about its own axis when making a hole in a ceiling, for instance. This would help increase labor efficiency in hole-cutting operation.

These and other objects, features and advantages of the invention will become more readily apparent from the following description and drawings.

BRIEF DESCRIPTION OF THE DRAWINGS

FIG. 5A is a diagram showing a radial rod whose effective length is variable;

FIG. 5B is a diagram showing radial rods whose effective lengths are fixed;

DETAILED DESCRIPTION OF THE PREFERRED EMBODIMENTS OF THE INVENTION

Figure 1:
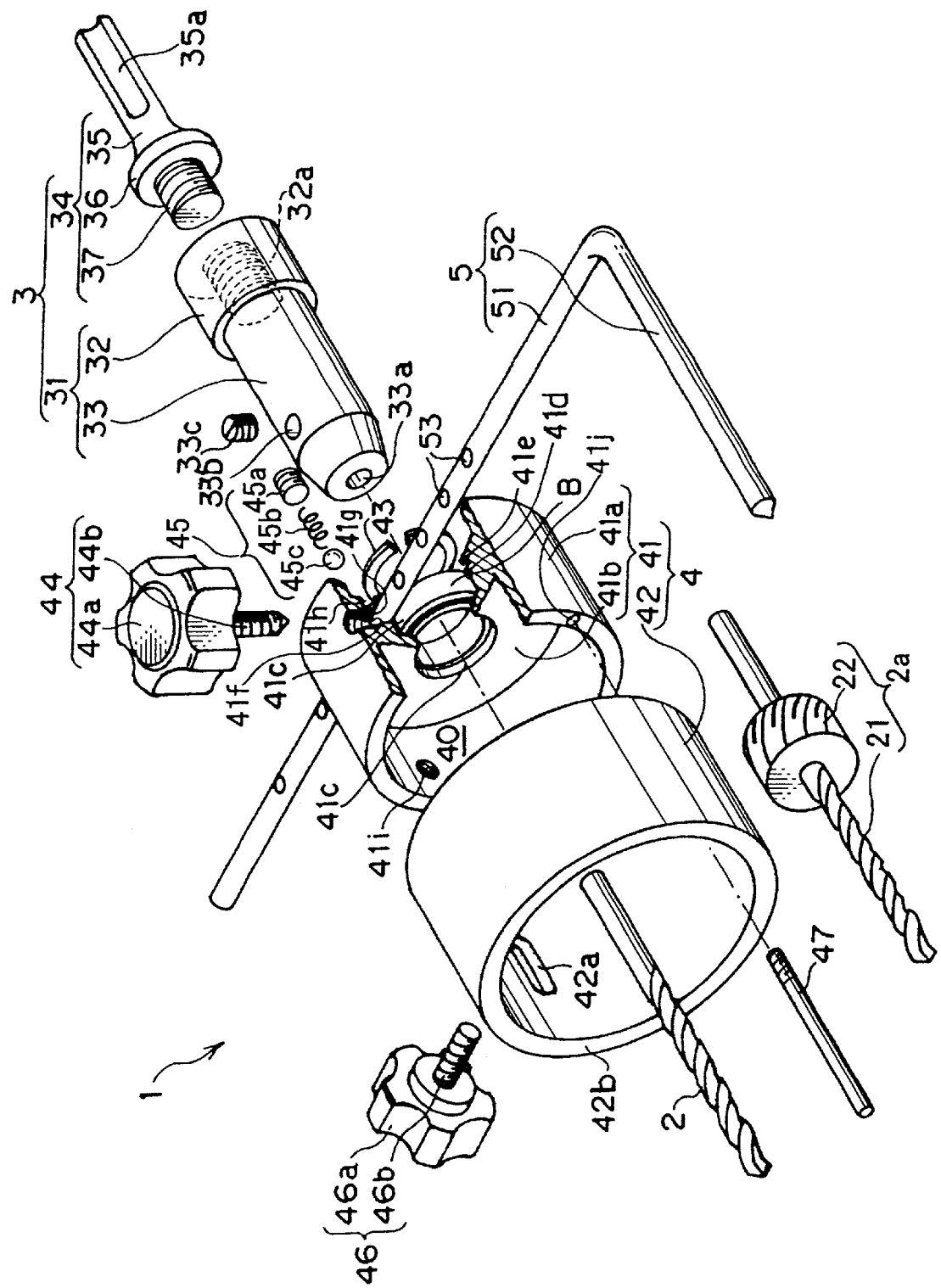
FIG. 1 is a partially cutaway exploded perspective diagram showing a circular hole cutting device according to a first embodiment of the invention.
Figure 2:
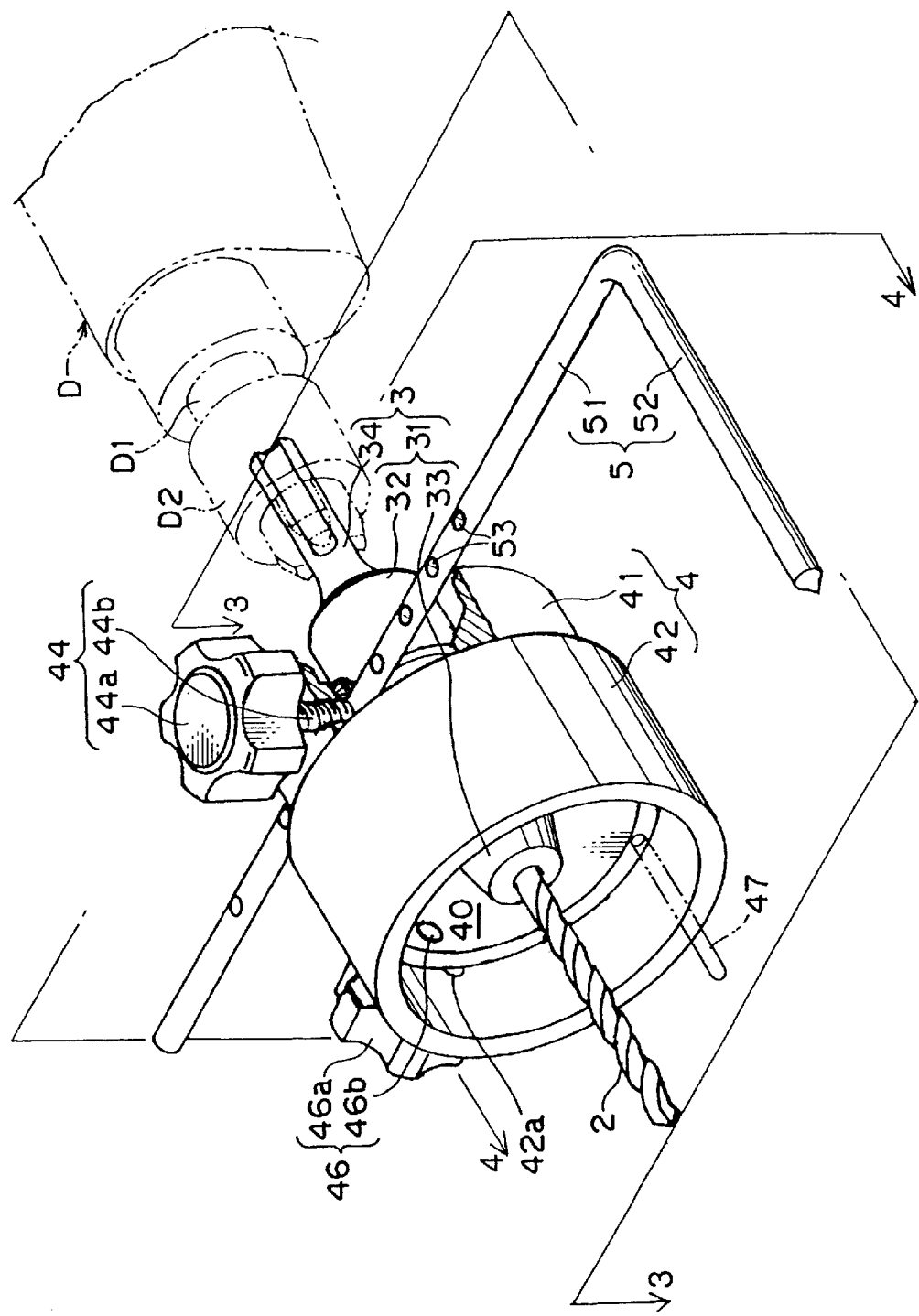
FIG. 2 is a partially cutaway perspective assembly diagram of the circular hole cutting device of FIG. 1.
Figure 3:
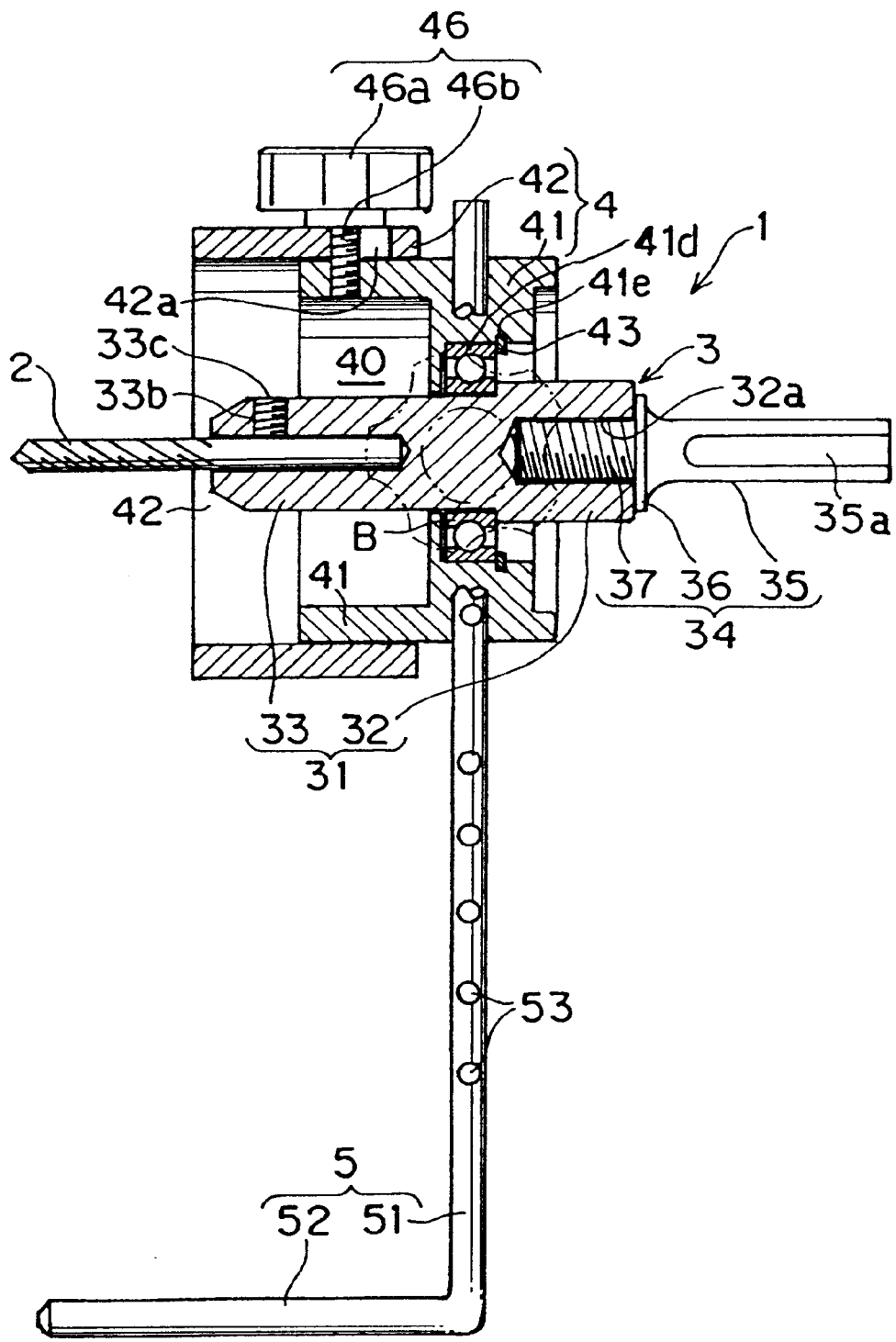
FIG. 3 is a cross-sectional diagram taken along lines 3—3 of FIG. 2.
Figure 4:
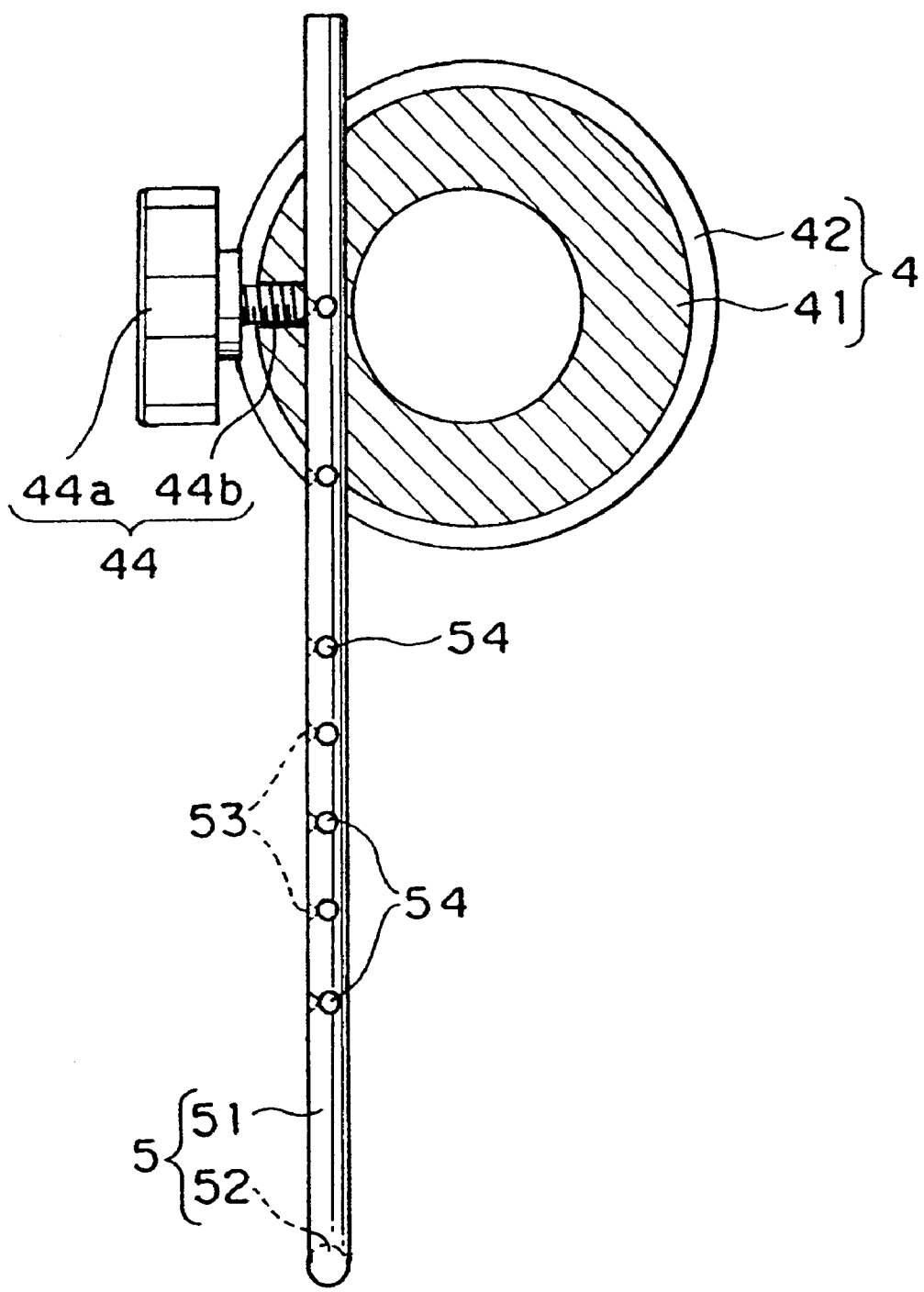
FIG. 4 is a cross-sectional diagram taken along lines 4—4 of FIG. 2.

FIG. 1 is a partially cutaway exploded perspective diagram showing a circular hole cutting device 1 according to a first embodiment of the invention, FIG. 2 is a partially cutaway perspective assembly diagram of the circular hole cutting device 1 of FIG. 1, FIG. 3 is a cross-sectional diagram taken along lines 3—3 of FIG. 2, and FIG. 4 is a cross-sectional diagram taken along lines 4—4 of FIG. 2. As depicted in these Figures, the circular hole cutting device 1 is a tool for making circular holes in an object like a ceiling or a wall (hereinafter represented by the ceiling as a typical object in which the holes are to be made) for passing electric wires or installing lighting fixtures.

The circular hole cutting device 1 comprises in its basic construction a bit 2 having cutting blades, such as an end mill or a router bit, a bit holder 3 which can be attached to a drive shaft D1 of an electric power tool D in such a way that the bit holder 3 with the bit 2 attached to a far end of the bit holder 3 rotates together with the drive shaft D1 on a common axis, a cover (relatively rotatable part) 4 which is fitted to the bit holder 3 and is relatively rotatable about its axis, and a radial rod (radial member) 5 attached to the cover 4 such that the amount of projection of the radial rod 5 in a direction intersecting the bit 2 can be varied.

In one alternative arrangement, a combination bit 2a having a straight bit portion 21 and a spot facing portion 22 provided between the straight bit portion 21 and a shank may be used instead of the bit 2, the spot facing portion 22 having a cylindrical shape whose diameter is larger than that of the straight bit portion 21. The combination bit 2a thus constructed is convenient when making a hole of a later-described type because it makes it possible to simultaneously cut a peripheral edge of the hole to make spot facing.

The bit holder 3 is constructed of a generally cylindrical bit-holding part 31 having a stepped stage in longitudinal cross section and a connecting shaft 34 detachably connected to a rear end of the bit-holding part 31 such that they are aligned on a common axis. The bit-holding part 31 has a large-diameter portion 32 provided immediately adjacent to the rear end of the bit-holding part 31 and a small-diameter portion 33 concentrically extending from a forward end of the large-diameter portion 32. A bearing B is fitted around a rear end (right end as illustrated in FIG. 3) of the small-diameter portion 33. The bearing B is located between the bit-holding part 31 and the cover 4. When a force pushing the bearing B toward the large-diameter portion 32 is exerted via the cover 4, the bearing B is prevented from moving onto the large-diameter portion 32 since the bearing B is pressed against the stepped stage between the small-diameter portion 33 and the large-diameter portion 32.

The bit-holding part 31 has a bit-fitting hole 33a formed concentrically in a far end surface of the bit-holding part 31 as well as a screw hole 33b tapped from a curved outer surface of the small-diameter portion 33 all the way to the bit-fitting hole 33a. The bit 2 is fixed to the bit-holding part 31 as a shank of the bit 2 is inserted into the bit-fitting hole 33a and a set screw 33c is screwed into the screw hole 33b so that an extreme end of the set screw 33c pushes tightly against a peripheral surface of the bit 2.

A screw hole 32a for attaching the connecting shaft 34 is formed in a rear end surface (right side as illustrated in FIG. 1) of the large-diameter portion 32 concentrically around a longitudinal axis of the bit-holding part 31.

The connecting shaft 34 is formed of a main shaft portion 35 which is linked to the drive shaft D1 of the electric power tool D (FIG. 2), a flange 36 provided at a forward end (left side as illustrated in FIG. 1) of the main shaft portion 35, and an externally threaded part 37 projecting forward from the flange 36 on a common axis. The connecting shaft 34 is joined to the bit-holding part 31 as the externally threaded part 37 is screwed tightly into the screw hole 32a.

The main shaft portion 35 has three straight flutes 35a grooved in a peripheral surface of the main shaft portion 35 all the way along its longitudinal axis at equal angular intervals around its circumference. On the other hand, the electric power tool D is provided with a chuck D2 having three jaws at a far end of the drive shaft D1. The flutes 35a of the main shaft portion 35 are fitted onto the laws of the chuck D2 and the main shaft portion 35 is fastened by making a specific action, whereby the connecting shaft 34 is connected to the drive shaft D1.

The cover 4 is constructed of a first cylindrical part 41 having a closed end and a second cylindrical part 42 slidably fitted over the first cylindrical part 41. The second cylindrical part 42 is enables adjustment of a contact area between the first cylindrical part 41 and the second cylindrical part 42 in their axial direction. The first cylindrical part 41 is formed of a cylindrical wall 41a and a bottom plate 41b which closes one end of the cylindrical wall 41a. In the illustrated example, the inner diameter of the cylindrical wall 41a is made approximately three times larger than the outer diameter of the bit-holding part 31 and the length of the cylindrical wall 41a is made slightly smaller than the length of the small-diameter portion 33 of the bit-holding part 31. A space surrounded by the cylindrical wall 41a and the bottom plate 41b constitutes a chip retaining space 40 for capturing and retaining chips cut by the bit 2.

A through hole 41c whose diameter is slightly larger than the outer diameter of the small-diameter portion 33 of the bit-holding part 31 is made in the bottom plate 41b of the cover 4 at its center, the through hole 41c being located concentrically with respect to the bit-holding part 31. A bearing-fitting hole 41d whose diameter is larger than the diameter of the through hole 41c is formed on the outside of the through hole 41c. When the bearing-fitting hole 41d is fitted over the bearing B which has been force-fitted to the rear end of the small-diameter portion 33 of the bit-holding part 31, the first cylindrical part 41 is fitted on the bit-holding part 31.

There is formed a circular groove 41e in an appropriate position of an inner surface of the bearing-fitting hole 41d all the way along its circumference. A C-ring 43 is fitted into the circular groove 41e with the bearing-fitting hole 41d fitted over the bearing B, whereby the first cylindrical part 41 fitted onto the bit-holding part 31 is prohibited from coming off.

A rod-passing hole 41f for fitting the radial rod 5 is formed in the bottom plate 41b of the first cylindrical part 41. The rod-passing hole 41f passes through the bottom plate 41b across the first cylindrical part 41 without intersecting the bearing-fitting hole 41d. Further, a first screw hole 41g is formed in the bottom plate 41b in its radial direction at right angles to the rod-passing hole 41f, the first screw hole 41g passing from a curved outer surface of the first cylindrical part 41 (bottom plate 41b) into the rod-passing hole 41f. A first fixing part 44 is screwed into the first screw hole 41g.

The first fixing part 44 is made of a generally disk-like knob 44a and a fixing screw 44b having a pointed tip and projecting from the center of an inside surface of the knob 44a. When the fixing screw 44b is screwed into the first screw hole 41g with the radial rod 5 inserted into the rod-passing hole 41f, the pointed tip of the fixing screw 44b goes into contact with the radial rod 5, forcing the radial rod 5 inward. As a consequence, the radial rod 5 is prevented from sliding along the rod-passing hole 41f and set in a fixed position.

A second screw hole 41h opening into the rod-passing hole 41f is formed in an outer flat surface of the bottom plate 41b. The second screw hole 41h accommodates a click mechanism 45 which is provided to produce a click, or tactile response, when the radial rod 5 is slid across the first cylindrical part 41. The click mechanism 45 includes a set screw 45a which is screwed into the second screw hole 41h, a coil spring 45b pushed into the second screw hole 41h by the set screw 45a, and a steel ball 45c located between the coil spring 45b and the radial rod 5.

When the click mechanism 45 is fitted in the second screw hole 41h, the steel ball 45c is forced against the radial rod 5 by a pushing force exerted by the coil spring 45b. When the radial rod 5 is slid across the first cylindrical part 41, the steel ball 45c drops into later-described click-producing indentations 54 (FIG. 4) which are formed in a sliding arm 51 of the radial rod 5. This action of the steel ball 45c produces clicks which are perceptible by an operator.

When cutting a hole with the circular hole cutting device 1, a far end surface (contact portion) 42b of the second cylindrical part 42 is held in contact with the surface of an object in which the hole is to be made. A slot 42a is formed in a cylindrical wall of the second cylindrical part 42 at its appropriate position. The slot 42a extends parallel to the axial direction of the second cylindrical part 42. A third screw hole 41i is formed in the cylindrical wall 41a of the first cylindrical part 41 at a position corresponding to the slot 42a in the cylindrical wall of the second cylindrical part 42. The third screw hole 41i and the slot 42a are used for fitting a second fixing part 46 to the cover 4.

The second fixing part 46 is made of a generally disk-like knob 46a and a fixing screw 46b projecting from the center of an inside surface of the knob 46a. The second fixing part 46 is fixed to the cover 4 when the fixing screw 46b is tightly screwed into the third screw hole 41i through the slot 42a. When the second fixing part 46 is loosened, the second cylindrical part 42 can be moved in its axial direction relative to the first cylindrical part 41 as much as the length of the slot 42a. This makes it possible to adjust the amount of projection of the second cylindrical part 42 from the first cylindrical part 41.

If the fixing screw 46b is screwed into the third screw hole 41i by turning the knob 46a after the amount of projection of the second cylindrical part 42 has been properly set, the knob 46a goes into contact with a curved outer surface of the second cylindrical part 42, whereby the set amount of projection of the second cylindrical part 42 is fixed.

Although the knob 44a of the first fixing part 44 and the knob 46a of the second fixing part 46 for fixing the radial rod 5 and the second cylindrical part 42, respectively, have a generally star-shaped structure in the present embodiment, wing nuts having wing-like projections may be employed instead of the knobs 44a, 46a.

The radial rod 5 has approximately the same diameter as the bit 2. One end of the radial rod 5 is bent at right angles to the sliding arm 51. This bent portion extending from the sliding arm 51 constitutes a pivot shaft 52. The length of the pivot shaft 52 is made larger than the distance between a far end of the cover 4 and the sliding arm 51 when the second cylindrical part 42 is most extended from the first cylindrical part 41.

As can be seen from FIG. 4, the aforementioned multiple click-producing indentations 54 are formed in a curved outer surface of the sliding arm 51 in a radial direction opposite to the direction in which the pivot shaft 52 extends in such a way that each of the click-producing indentations 54 would align with the second screw hole 41h when the radial rod 5 is slid across the first cylindrical part 41. Further, a plurality of rod-fixing indentations 53 are formed in the curved outer surface of the sliding arm 51 in a radial direction perpendicular to the click-producing indentations 54 in such a way that each of the rod-fixing indentations 53 would align with the first screw hole 41g. The pointed tip of the fixing screw 44b of the first fixing part 44 fits into one of the rod-fixing indentations 53 while the steel ball 45c of the click mechanism 45 fits into one of the click-producing indentations 54. When the operator slides the radial rod 5 across the first cylindrical part 41 to adjust the extending length of the sliding arm 51, the steel ball 45c forced against the radial rod 5 by the coil spring 45b drops into the click-producing indentations 54. This action produces clicks perceptible by the operator and makes it easy to set the effective length of the radial rod 5 (or the distance between the axial center of the bit 2 and the pivot shaft 52).

A fourth screw hole 41j is formed in a forward perimetric surface of the first cylindrical part 41. The fourth screw hole 41j is provided for fitting a second pivot shaft 47, which is used for providing a pivot about which the bit 2 is turned when cutting a hole whose diameter is equal to the diameter of the second cylindrical part 42.

Now, the radial rod 5 and its variations are described in detail referring to FIGS. 5A and 5B which illustrate various types of radial rods. FIG. 5A shows the radial rod 5 whose effective length is variable, and FIG. 5B shows seven radial rods 5a–5g having fixed effective lengths.

The radial rod 5 shown in FIG. 5A is of a type whose effective length (the distance between the axial center of the bit 2 and the pivot shaft 52) can be varies by sliding the radial rod 5 across the first cylindrical part 41 as already stated. Seven rod-fixing indentations 53 including the first rod-fixing indentation 531 which provides a minimum effective length to the seventh rod-fixing indentation 537 which provides a maximum effective length are formed in the curved outer surface of the sliding arm 51. It is therefore possible to obtain a desired effective length with the single radial rod 5 by selecting one of the rod-fixing indentations 531–537.

In contrast, the first to seventh radial rods 5a–5g shown in FIG. 5B individually provide the fixed effective lengths.

Specifically, the first radial rod 5a has one indentation which corresponds to the first rod-fixing indentation 531 of FIG. 5A, the second radial rod 5b has one indentation which corresponds to the second rod-fixing indentation 532 of FIG. 5A, . . . , and the seventh radial rod 5g has one indentation which corresponds to the seventh rod-fixing indentation 537 of FIG. 5A.

When this type of radial rods 5a–5g are provided, the operator just need to select one of the radial rods 5a–5g that provides the desired effective length. It is possible to cut a hole of the correct diameter only if the operator selects the appropriate radial rod 5a–5g. The radial rods 5a–5g having the fixed effective lengths may be supplied as accessories to the circular hole cutting device 1.

Figure 6A:
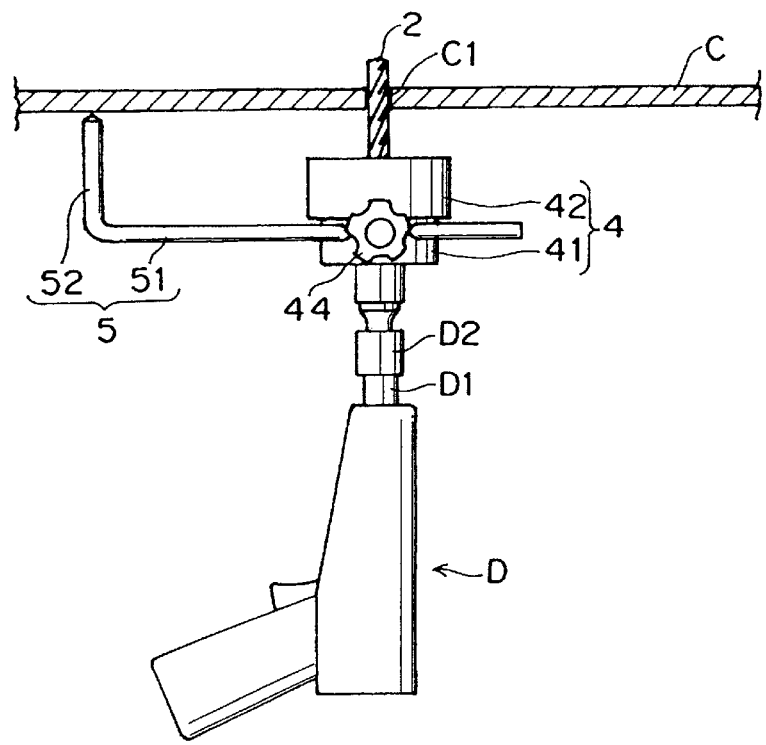
FIG. 6A is a side view showing a state where a center hole has just been made at the center of a hole to be formed in a ceiling by turning a bit.
Figure 6B:
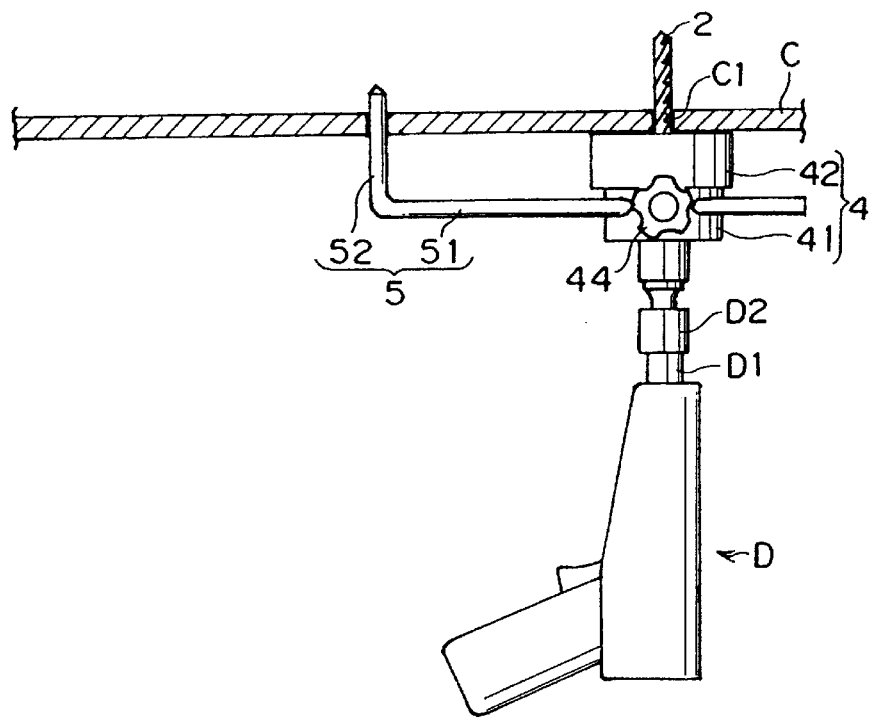
FIG. 6B is a side view showing a state where a pivot shaft of the radial rod has been fitted into the center hole.
Figure 7A:
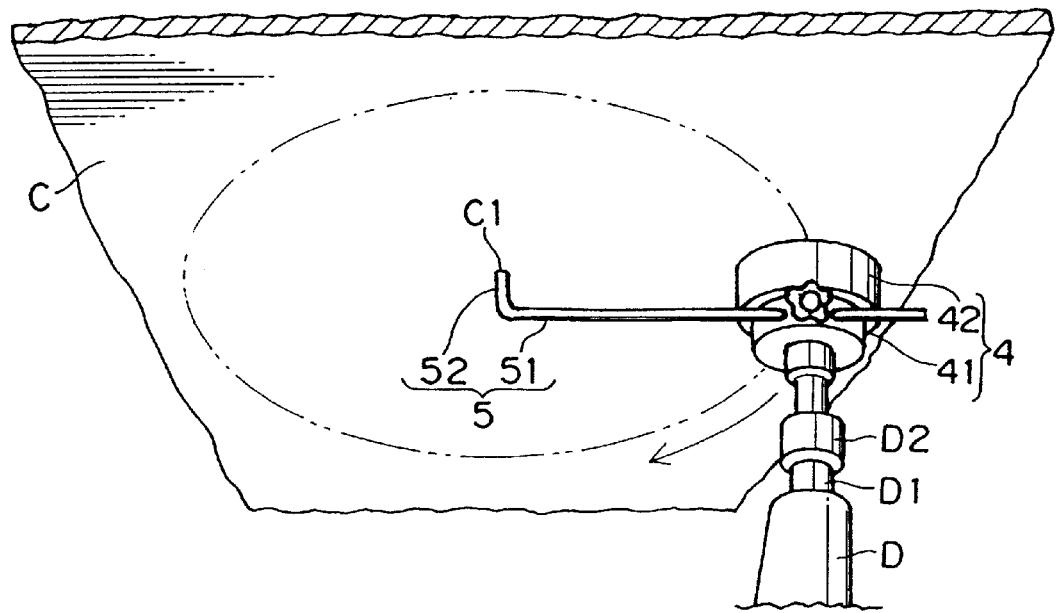
FIG. 7A is a perspective view showing a state where the hole is being cut in the ceiling by turning the circular hole cutting device clockwise about the pivot shaft.
Figure 7B:
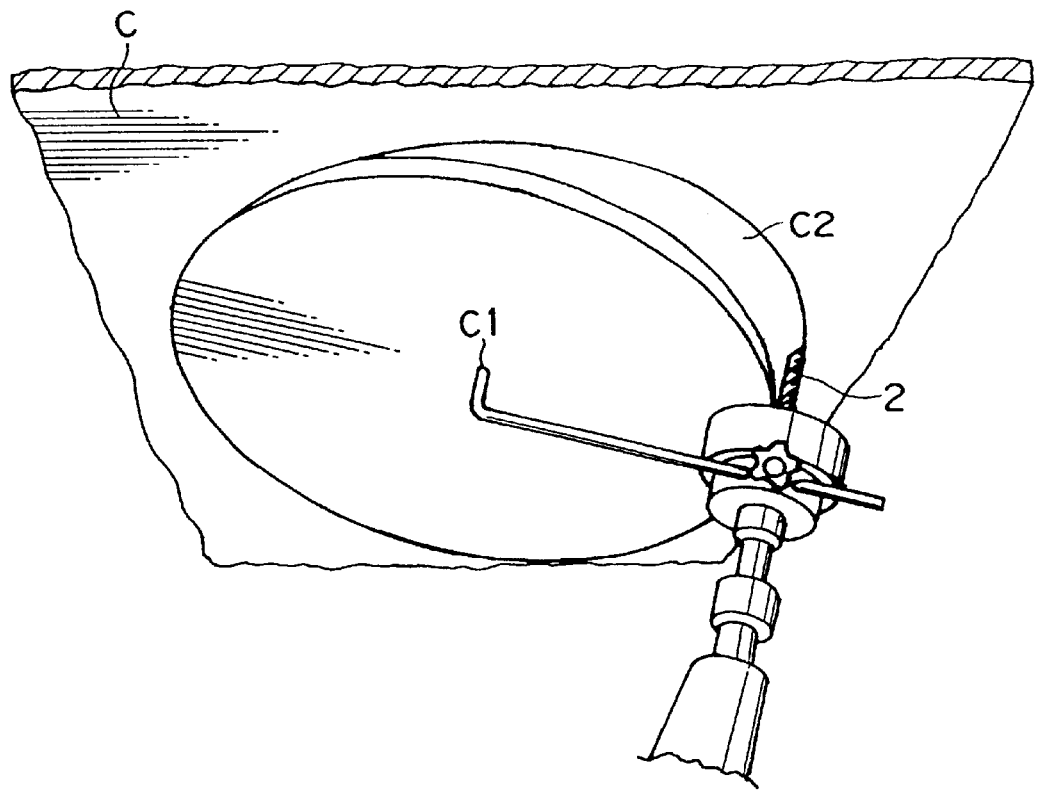
FIG. 7B is a perspective view showing a state where the hole has just been cut in the ceiling by turning the circular hole cutting device all around the pivot shaft.

Operation of the circular hole cutting device 1 provided with the radial rod 5 of the type shown in FIG. 5A is described referring to FIGS. 6A–6B and 7A–7B which illustrate how the circular hole cutting device 1 works. FIG. 6A is a side view showing a state where a center hole C1 has just been made at the center of a hole C2 (FIG. 7B) to be formed in a ceiling C by turning the bit 2, and FIG. 6B is a side view showing a state where the pivot shaft 52 has been fitted into the center hole C1. FIG. 7A is a perspective view showing a state where the hole C2 is being cut in the ceiling C by turning the circular hole cutting device 1 clockwise about the pivot shaft 52, and FIG. 7B is a perspective view showing a state where the hole C2 has just been cut in the ceiling C by turning the circular hole cutting device 1 all around the pivot shaft 52.

The above operation of the circular hole cutting device 1 is explained in further detail below. To cut the hole C2 (FIG. 7B) in the ceiling C, the first fixing part 44 is loosened until the pointed tip of the fixing screw 44b is located outside of an inner surface of the rod-passing hole 41f, and the sliding arm 51 of the radial rod 5 is inserted into the rod-passing hole 41f from the right side (as illustrated in FIG. 1) in such a way that the sliding arm 51 is properly positioned in the rod-passing hole 41f to obtain a desired effective length and the pivot shaft 52 becomes parallel to the bit 2 (or the rod-fixing indentations 53 are directed toward the first screw hole 41g). The operator can check out whether the pivot shaft 52 has been set to the desired effective length (cutting radius) by feeling clicks produced when the steel ball 45c drops into the click-producing indentations 54.

When the pivot shaft 52 has been set to the desired effective length, the operator turns the knob 44a of the first fixing part 44 so that the fixing screw 44b is screwed into the first screw hole 41g. Consequently, the pointed tip of the fixing screw 44b fits into one of the rod-fixing indentations 53 and the first fixing part 44 is secured in position. The sliding arm 51 of the radial rod 5 is set to the length corresponding to the radius of the hole C2 to be cut in the ceiling C in this fashion. Next, the second fixing part 46 is loosened to allow the second cylindrical part 42 to move relative to the first cylindrical part 41, and the amount of projection of the second cylindrical part 42 from the first cylindrical part 41 is adjusted such that the bit 2 would project from the second cylindrical part 42 by an amount appropriate for drilling a through hole in the ceiling C. When the amount of projection of the bit 2 has been properly adjusted in this fashion, the second fixing part 46 is fastened to secure the second cylindrical part 42 to the first cylindrical part 41.

Subsequently, a tip end of the bit 2 of the circular hole cutting device 1 is positioned at the center of hole C2 to be formed in the ceiling C and the electric power tool D is activated, whereby the bit 2 turns at a high speed and drills the center hole C1 in the ceiling C as shown in FIG. 6A. Upon completion of this drilling operation, the bit 2 is pulled out of the center hole C1.

Next, the sliding arm 51 of the radial rod 5 is fitted in the center hole C1 and the electric power tool D is turned on so that the bit 2 turning at the high speed drills a hole in the ceiling C at a distance corresponding to the effective length of the sliding arm 51 from the center hole C1 as shown in FIG. 6B.

After confirming that the bit 2 has drilled through the ceiling C, the operator turns the circular hole cutting device 1 clockwise about the pivot shaft 52 while maintaining the high turning speed of bit 2 as depicted in FIG. 7A. Since the bit 2 turns at the high speed, its blades cut the ceiling C along a circular path whose radius corresponds to the effective length of the sliding arm 51 as shown in FIG. 7A. Chips produced during this hole-cutting operation drop from the ceiling C into the cover 4, which prevents downward dispersion of the chips.

When the circular hole cutting device 1 has been turned clockwise all around the pivot shaft 52, a circular portion of the ceiling C having the radius corresponding to the effective length of the sliding arm 51 is cut away and the hole C2 of the desired diameter is made in the ceiling C as shown in FIG. 7B.

As shown in the foregoing discussion, the circular hole cutting device 1 of the invention can be attached to the drive shaft D1 of the electric power tool D in such a way that the bit holder 3 fitted with the bit 2 rotates together with the drive shaft D1 on the common axis. The circular hole cuttin device 1 comprises the bit holder 3 with the bit 2 attached to a far end of the bit holder 3 on the common axis, the cover 4 fitted to the bit holder 3 relatively rotatably about its axis, and the radial rod 5 having the sliding arm 51 and the pivot shaft 52 attached to the cover 4 such that the amount of projection of the sliding arm 51 in the direction intersecting the bit 2 can be varied. With this construction, it is possible to form the circular hole C2 whose radius corresponds to the effective length of the sliding arm 51 in the ceiling C by drilling the center hole C1 for fitting the pivot shaft 52 at the center of hole C2 to be formed in the ceiling C, inserting the pivot shaft 52 in the center hole C1, activating the electric power tool D to turn the bit 2 at the high speed, and slowly turning the electric power tool D about the pivot shaft 52 with the bit 2 passing through the ceiling C so that the bit 2 turning at the high speed cuts the ceiling C along the circular path.

Since the far end of the cover 4 is held in sliding contact with the ceiling C during the hole-cutting operation, the cover 4 captures the chips, preventing their dispersion in a reliable fashion. Accordingly, the chips would not fall on the operator and this serves to greatly improve work environment.

Moreover, the circular hole cutting device 1 is connected to the electric power tool D by attaching the bit holder 3 to the drive shaft D1 of the electric power tool D. The drive shaft D1 of the electric power tool D designed to hold a drill bit normally has a chuck mechanism at the far end. The drive shaft D1 of this kind is usually designed to hold various types of drill bits. This means that the circular hole cutting device 1 can be connected to practically any electric power tool D having a chuck mechanism regardless of the manufacturer or type of the electric power tool D. It would be recognized that the circular hole cutting device 1 of the invention provides great flexibility in application.

When using one of the radial rods 5a–5g shown in FIG. 5B having the fixed effective lengths, the operator should select the proper one according to the diameter of the hole C2 to be formed in the ceiling C and perform the same operation as described above with the selected radial rod fitted to the cover 4.

Figure 8:
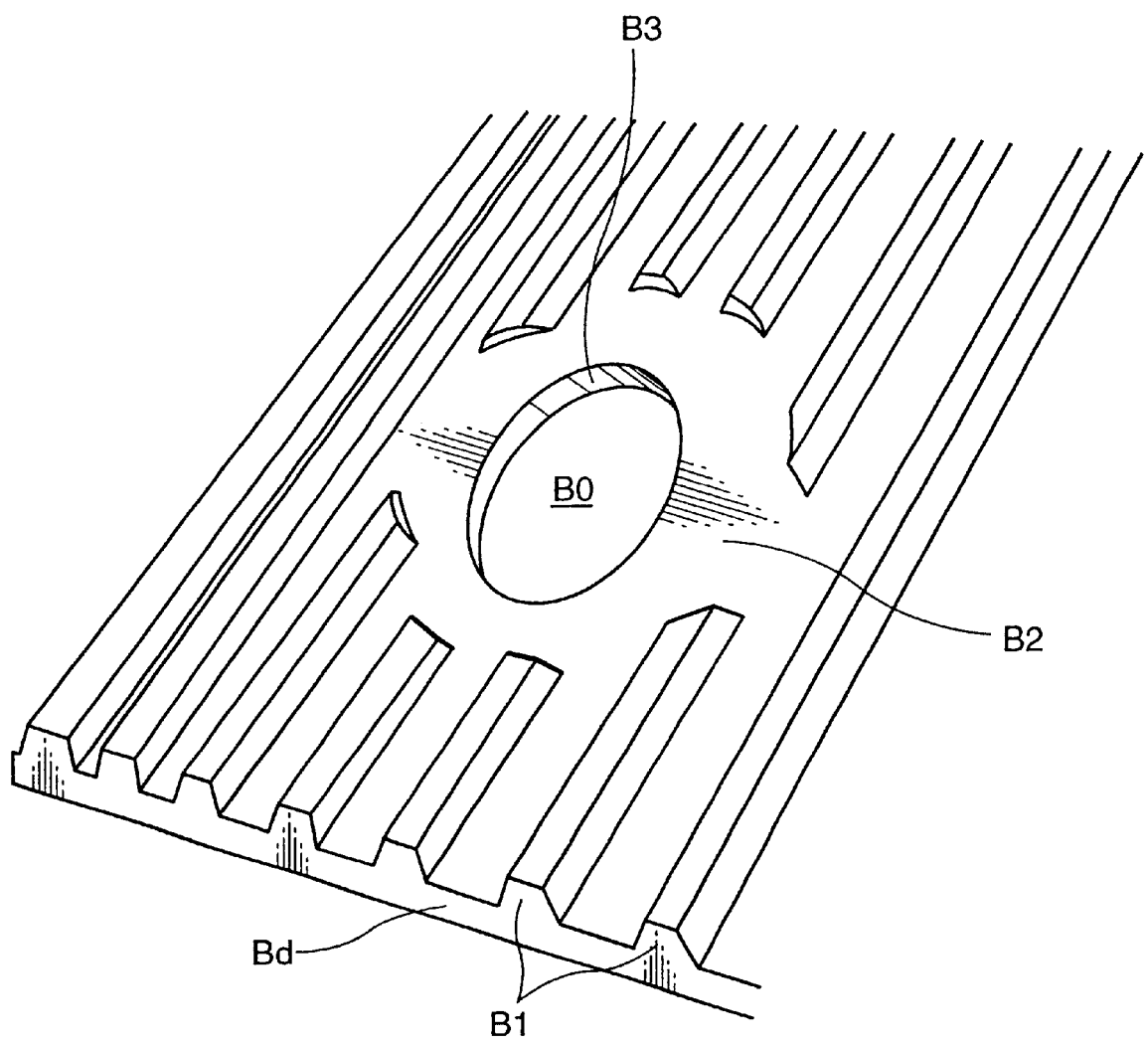
FIG. 8 is a perspective view showing an example of a hole formed in a board using a combination bit.

FIG. 8 is a perspective view showing an example of a hole B0 formed in a board Bd using the aforementioned combination bit 2a. The combination bit 2a shown in FIG. 1 is used when making the hole B0 surrounded by spot facing B2 in the board Bd having a plurality of parallel ridges B1 formed on a drilling surface. The spot facing B2 is often made on the surface of the board Bd on which the ridges B1 are formed for installing a lighting fixture, for instance.

If the combination bit 2a is attached to the circular hole cutting device 1 instead of the bit 2 and the amount of projection of the spot facing portion 22 from the second cylindrical part 42 is made equal to the height of the ridges B1, it is possible to cut a peripheral part of the hole B0 to be made in the board Bd with the straight bit portion 21 and cut the ridges B1 with the spot facing portion 22 to form the spot facing B2.

It is possible to make the spot facing B2 having a flat surface which facilitates installation of a lighting fixture using the combination bit 2a as discussed above. Since both the drilling and spot facing operations can be carried out in a single process, the use of the combination bit 2a is extremely convenient.

Figure 9:
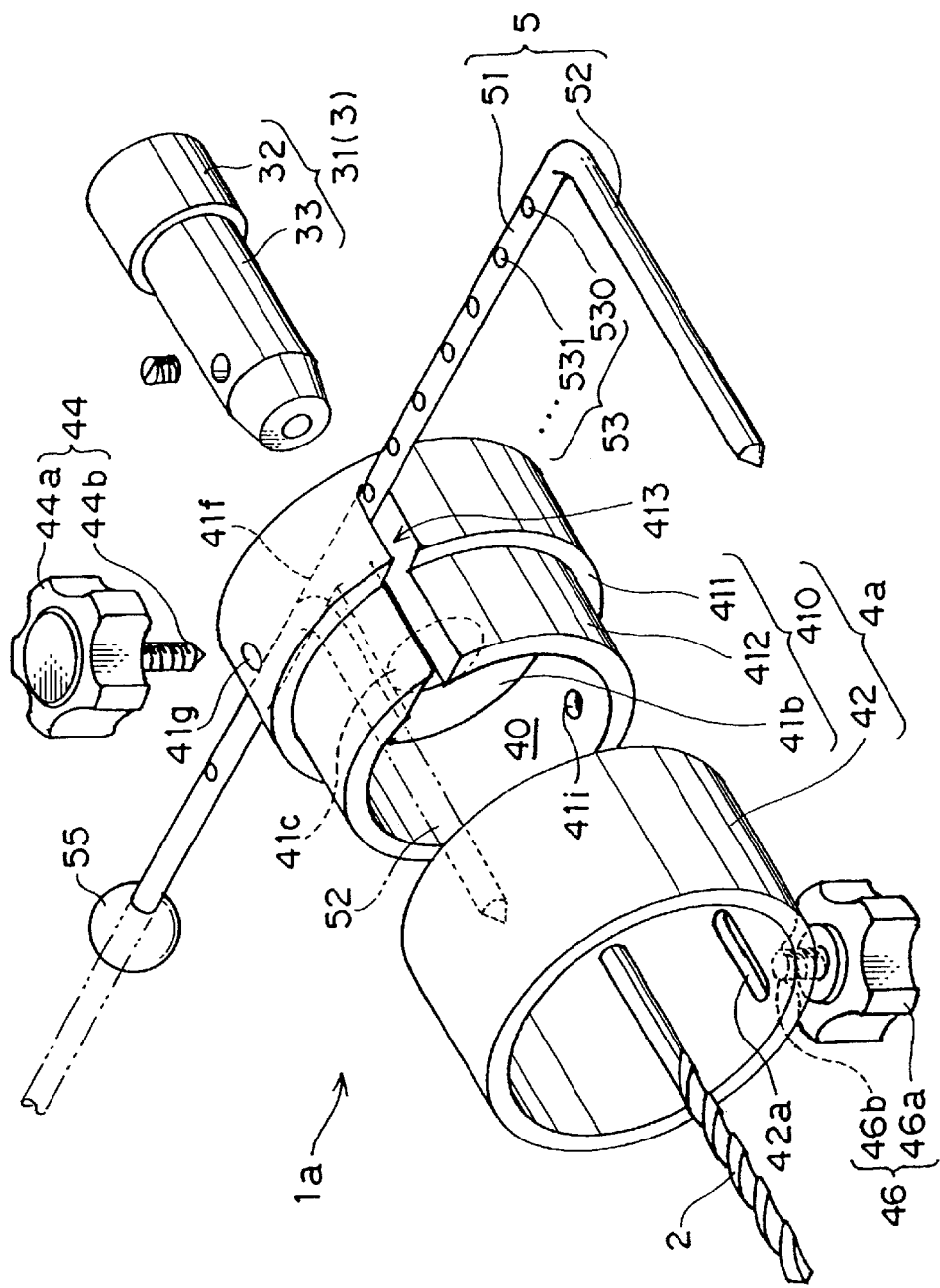
FIG. 9 is an exploded perspective view showing a circular hole cutting device according to a second embodiment of the invention.
Figure 10:
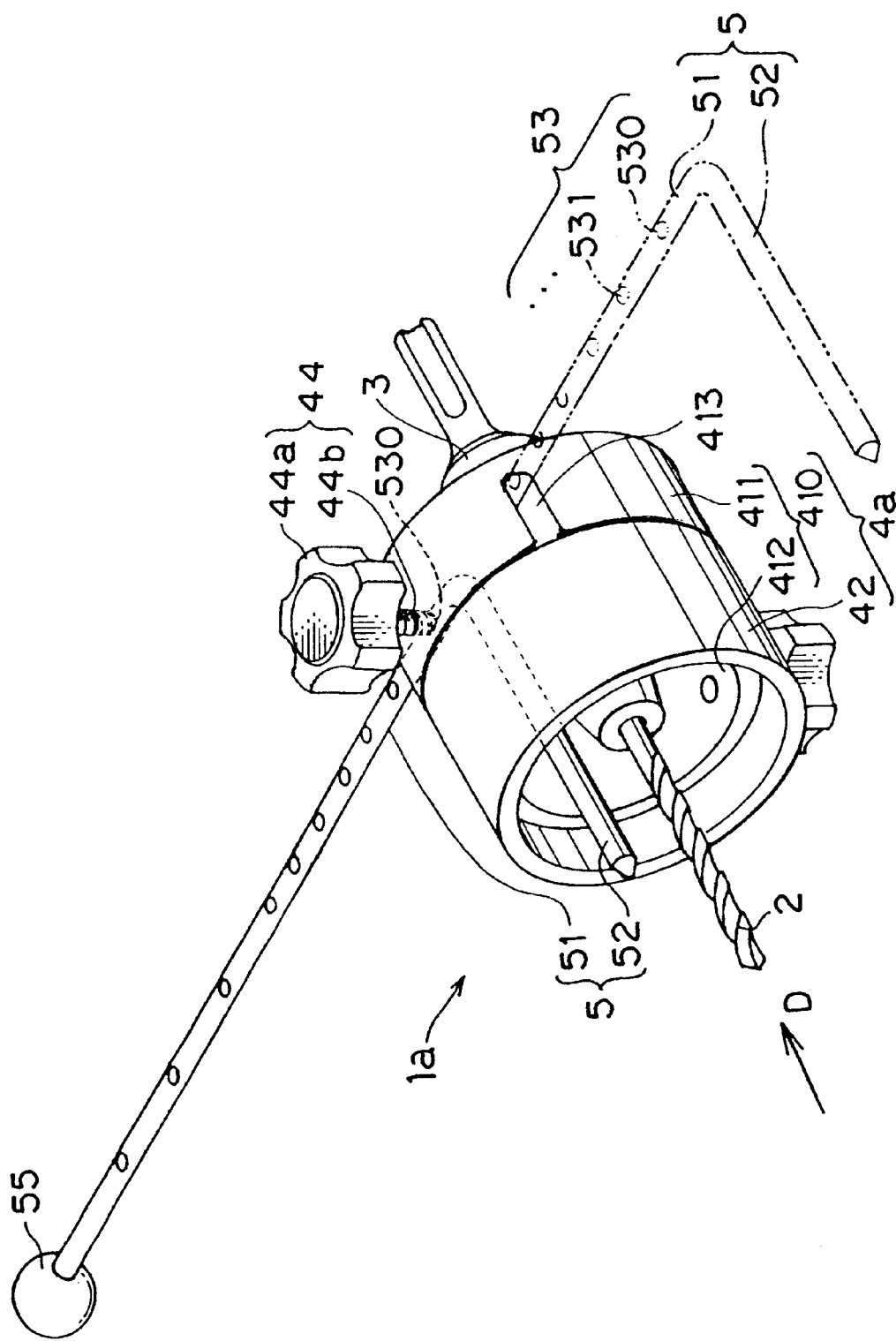
FIG. 10 is a perspective assembly diagram of the circular hole cutting device of FIG. 9.
Figure 11:
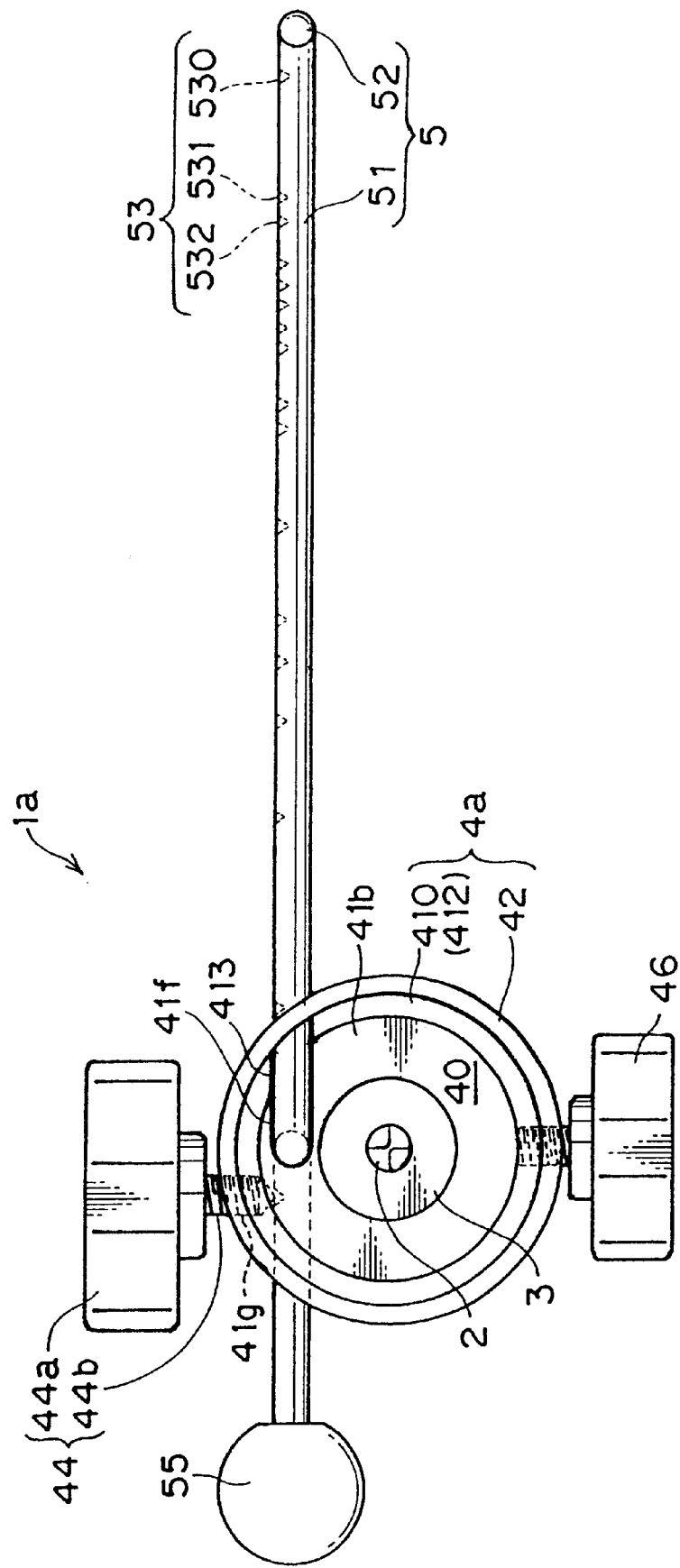
FIG. 11 is a view of the circular hole cutting device taken in the direction of arrow D of FIG. 10.

FIG. 9 is an exploded perspective view showing a circular hole cutting device 1a according to a second embodiment of the invention, FIG. 10 is a perspective assembly diagram of the circular hole cutting device 1a of FIG. 9, and FIG. 11 is a view of the circular hole cutting device 1a taken in the direction of arrow D of FIG. 10. In this embodiment, a first cylindrical part 410 of a cover 4a has a large-diameter portion 411 formed from a rear end (right end as illustrated in FIG. 9) of the first cylindrical part 410 and having the same outer diameter as a second cylindrical part 42, and a small-diameter portion 412 formed from a forward end of the first cylindrical part 410 and having an outer diameter slightly larger than the inner diameter of the second cylindrical part 42.

A radial rod 5 is provided with a spherical knob 55 which is screwed onto an end of a sliding arm 51 opposite to its end from where a pivot shaft 52 extends. More specifically, one end of the sliding arm 51 is externally threaded and an internally threaded hole is made in the spherical knob 55 so that the spherical knob 55 can be fitted to the sliding arm 51 of the radial rod 5 by screwing the spherical knob 55 onto the threaded end of the sliding arm 51. The provision of the spherical knob 55 makes it easier to slide the pivot shaft 52 across the cover 4a by hand when adjusting the amount of projection of the sliding arm 51, or its effective length.

The sliding arm 51 of this embodiment has an innermost rod-fixing indentation 530 formed closer to the pivot shaft 52 than the first rod-fixing indentation 531 of the first embodiment (FIG. 5A). With the provision of the innermost rod-fixing indentation 530, a pointed tip of a fixing screw 44b of a first fixing part 44 fits into the innermost rod-fixing indentation 530 with the pivot shaft 52 retracted into an internal space (chip retaining space 40) of the cover 4a as shown by alternate long and two short dashed lines in FIG. 9.

An elongate cutout 413 is made in the first cylindrical part 410 of the cover 4a. This cutout 413 extends from one end of a rod-passing hole 41f formed in a ring-shaped bottom plate 41b of the large-diameter portion 411 toward the small-diameter portion 412 and through the small-diameter portion 412 in a direction parallel to the longitudinal axis of a bit 2. The width of the cutout 413 is made slightly larger than the diameter of the pivot shaft 52.

To retract the pivot shaft 52 from a position shown by the alternate long and two short dashed lines of FIG. 9 to a position shown by solid lines in FIG. 9, an operator removes the second cylindrical part 42 from the small-diameter portion 412 of the first cylindrical part 410 after loosening a second fixing part 46 and pulls the radial rod 5 by holding the spherical knob 55 such that the pivot shaft 52 is pulled toward the cover 4a and retracted into its internal space passing through the cutout 413.

The operator turns a knob 44a of the first fixing part 44 such that the pointed tip of the fixing screw 44b is forced into the innermost rod-fixing indentation 530, fits the second cylindrical part 42 over the small-diameter portion 412 of the first cylindrical part 410 and secures the second cylindrical part 42 by tightening the second fixing part 46, whereby the radial rod 5 is set in position with the pivot shaft 52 accommodated in the chip retaining space 40 as shown by solid lines in FIG. 10.

Further, a first screw hole 41g in which the fixing screw 44b of the first fixing part 44 is screwed is formed in the bottom plate 41b of the first cylindrical part 410. In this embodiment, the first screw hole 41g is made at a position slightly offset from line extended from a longitudinal axis of a bit-holding part 31 of a bit holder 3, which is perpendicular to the sliding arm 51, toward the spherical knob 55 as shown in FIG. 11. Therefore, the pivot shaft 52 can be retracted all the way into the cover 4a without interfering with the fixing screw 44b.

Further, in the second embodiment, a third screw hole 41i in the small-diameter portion 412 of the first cylindrical part 410 and a slot 42a in the second cylindrical part 42 for fitting the second fixing part 46 are located opposite to the first fixing part 44 with respect to the bit 2. This arrangement makes it possible to manipulate the second fixing part 46 without interfering with the spherical knob 55.

According to the circular hole cutting device 1a of the second embodiment, the pivot shaft 52 can be retracted into the first cylindrical part 410 through the cutout 413 by pulling the spherical knob 55 with the second cylindrical part 42 removed from the first cylindrical part 410. Compared to the circular hole cutting device 1 of the first embodiment without the provision of the cutout 413, the distance between the bit 2 and the pivot shaft 52 can be made much smaller in this embodiment. Consequently, it is even possible to make a hole having a diameter smaller than that of the small-diameter portion 412 of the first cylindrical part 410 using the circular hole cutting device 1a. It would therefore be appreciated that the circular hole cutting device 1a of the second embodiment provides even great flexibility in application.

Although the second cylindrical part 42 is a straight cylinder member having the same diameter along its length in both the first and second embodiments, the second cylindrical part 42 need not necessary be the straight cylinder member according to the invention. For example, the second cylindrical part 42 may have a stepped cylinder structure with its forward portion having a larger diameter. This modified structure would serve to capture and retain drill chips in the second cylindrical part 42 in a more reliable fashion since it has the increased diameter.

Figure 12:
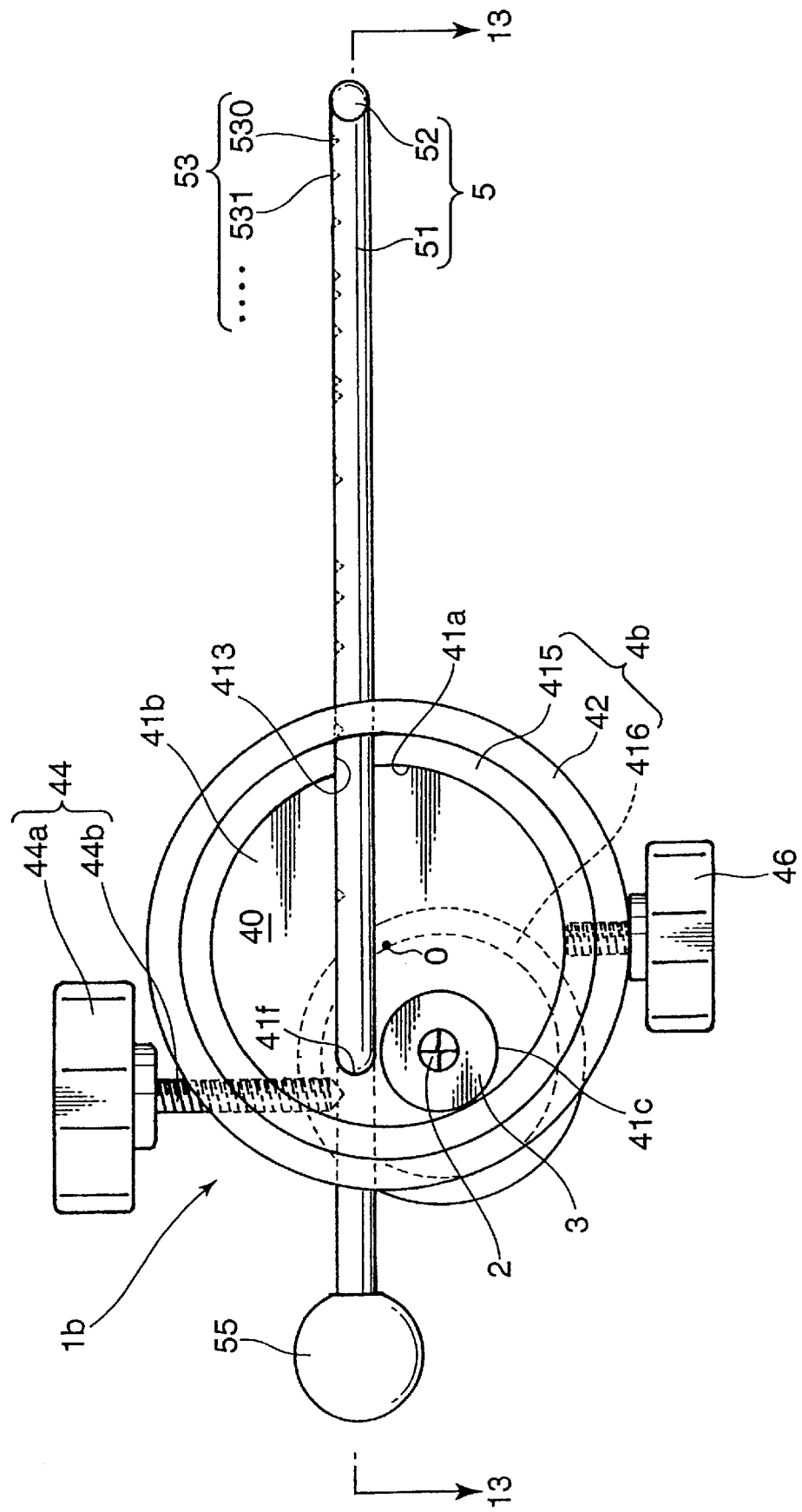
FIG. 12 is a bottom view showing a circular hole cutting device according to a third embodiment of the invention.
Figure 13:
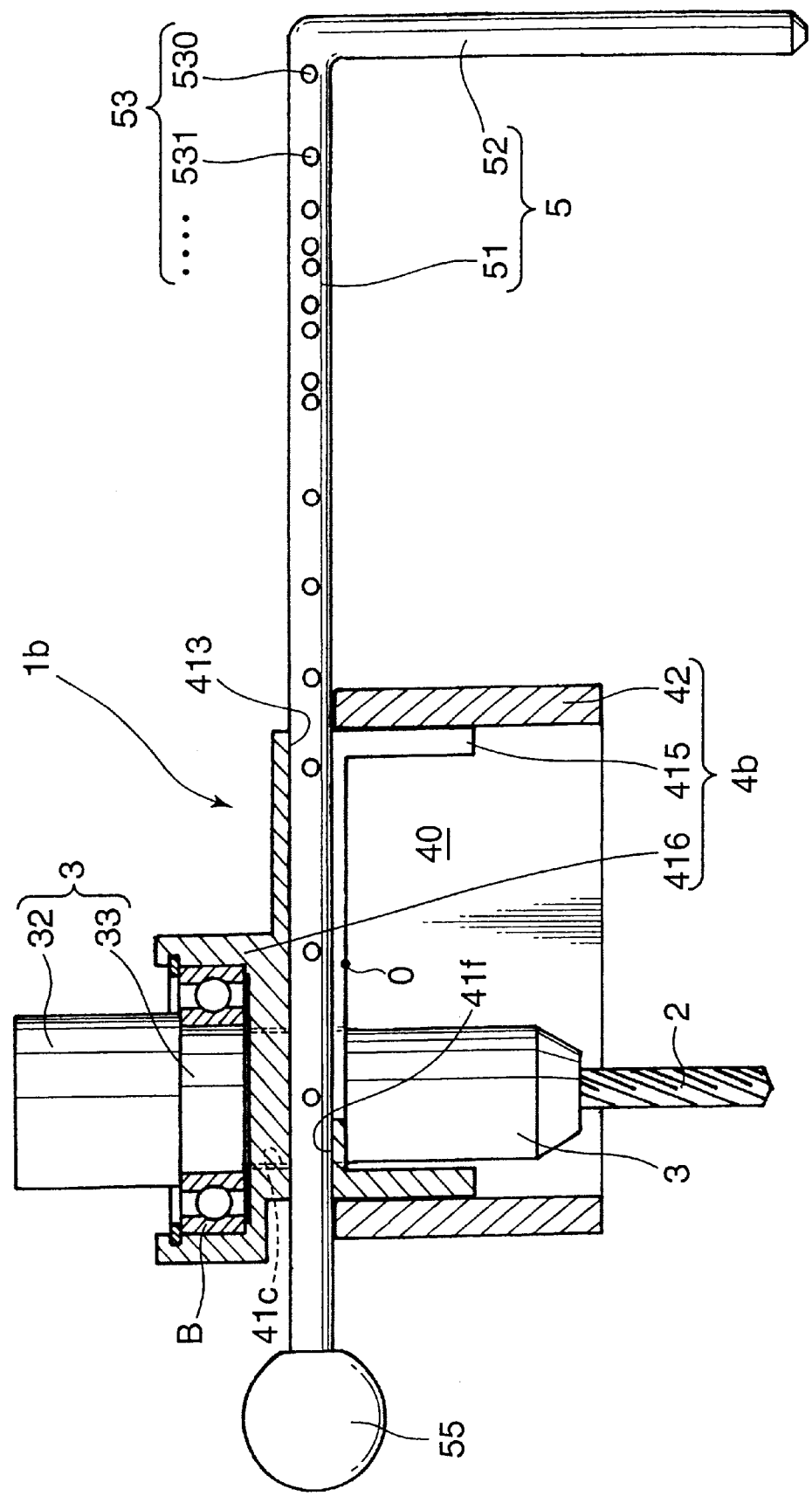
FIG. 13 is a cross-sectional diagram taken along lines 13—13 of FIG. 12.
Figure 14:
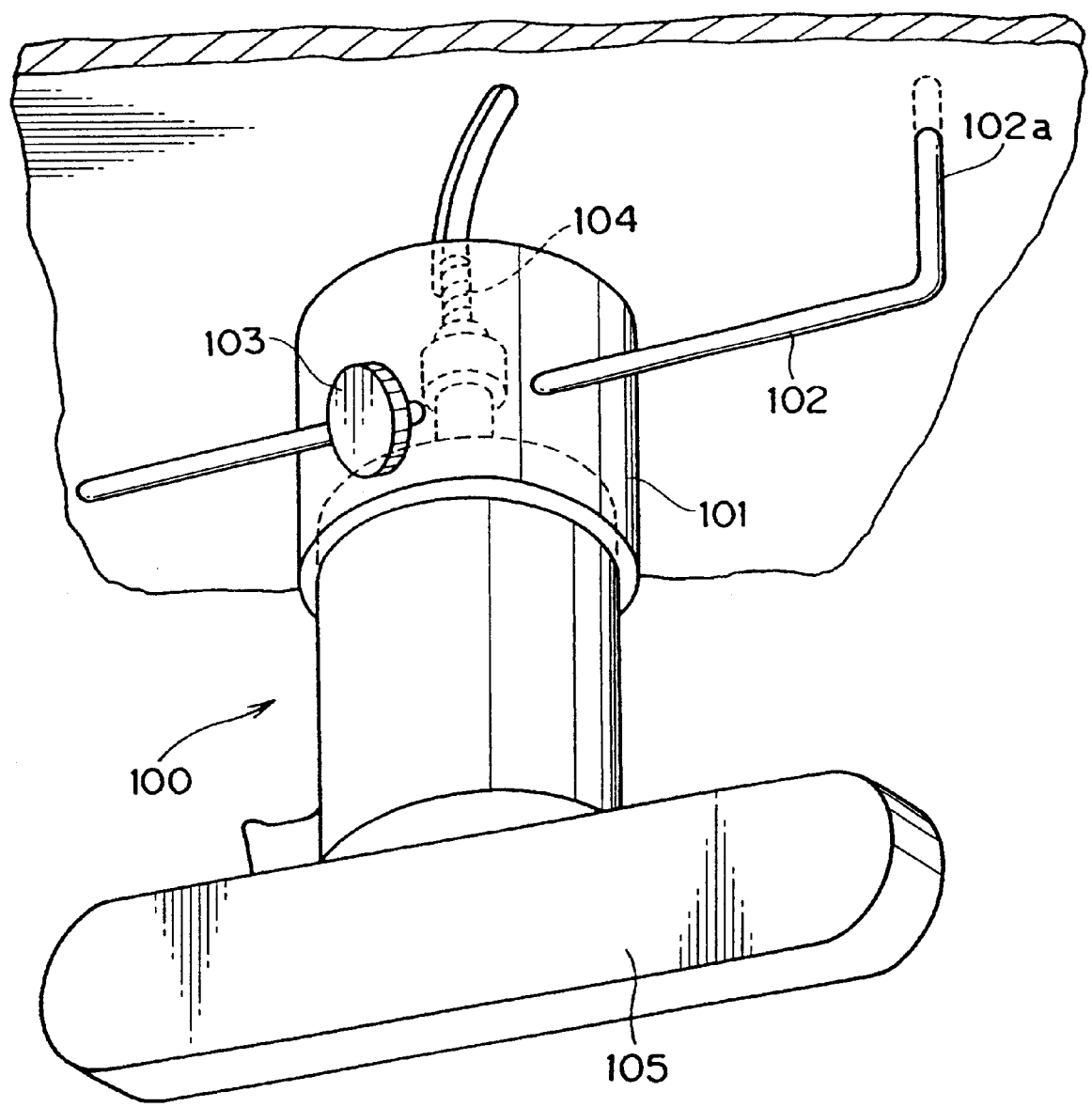
FIG. 14 is a perspective view of a conventionally known circular hole cutting device.

FIG. 12 is a bottom view showing a circular hole cutting device 1b according to a third embodiment of the invention, and FIG. 13 is a cross-sectional diagram taken along lines 13—13 of FIG. 12. According to this invention, the bit holder 3 need not necessarily be arranged on a common axis with the cover 4. The circular hole cutting device 1b of the third embodiment is an example having an eccentric arrangement. Specifically, the circular hole cutting device 1b of this embodiment differs from the circular hole cutting devices 1, 1a of the first and second embodiments in that a bit holder 3 is located at a position offset from a central axis O of a cover 4b and a radial rod 5 is attached to the cover 4b in such a way that the radial rod 5 passes close to the central axis O of the cover 4b, as illustrated in FIGS. 12 and 13. A cutout 413 is formed in a first cylindrical part 415 so that a pivot shaft 52 of the radial rod 5 can be retracted into an internal space (chip retaining space 40) of the cover 4b in a manner similar to the circular hole cutting device 1a of the second embodiment.

In the circular hole cutting device 1b of the third embodiment, the first cylindrical part 415 which is one constituent part of the cover 4b is characterized in that a through hole 41c formed in a bottom plate 41b of the first cylindrical part 415 for fitting the bit holder 3 is offset from the central axis O of the cover 4b to make the aforementioned eccentric arrangement. Further, the first cylindrical part 415 has a bit holder retaining boss 416 projecting rearward (leftward as illustrated in FIG. 13) from the bottom plate 41b on a common axis with the through hole 41c.

The bit holder retaining boss 416 is also offset from the central axis O of the cover 4b. A rear end of a small-diameter portion 33 of the bit holder 3 is rotatably supported by the bit holder retaining boss 416 with a bearing B placed in between as illustrated in FIG. 13. Generally, the circular hole cutting device 1b of the third embodiment has otherwise the same construction as the foregoing embodiments.

In this embodiment, the bit holder 3 is offset to a direction opposite to the pivot shaft 52 with respect to the central axis O of the cover 4b, so that the chip retaining space 40 has an open area extending toward the pivot shaft 52 from a bit 2.

Since the bit holder 3 is fitted at the position offset from the central axis O of the cover 4b, the radial rod 5 can be located closer to the central axis O of the cover 4b in the circular hole cutting device 1b of the third embodiment. This makes it possible to increase the distance between two contact points between an sliding arm 51 of the radial rod 5 and a cylindrical wall 41a of the first cylindrical part 415 and, as a consequence, the first cylindrical part 415 can support the radial rod 5 in a more stable manner.

As so far described, a circular hole cutting device in one form of the invention which makes a circular hole in an object when turned about a center hole formed in the object comprises a bit holder which can be attached to a drive shaft of an electric power tool in such a way that the bit holder with a bit attached to a far end rotates together with the drive shaft on a common axis, and a relatively rotatable part fitted to the bit holder relatively rotatably about the axis of the drive shaft, the relatively rotatable part having a pivot shaft which is located at a position offset from the bit in its radial direction and can be inserted into the center hole formed by the bit.

According to the invention, it is possible to form a circular hole whose radius corresponds to the distance between the bit and the pivot shaft in the object by inserting the pivot shaft in the center hole, activating the electric power tool to turn the bit at a high speed, and slowly turning the electric power tool about the pivot shaft with the bit passing through the object so that the bit turning at the high speed cuts the object along a circular path.

The circular hole cutting device of the invention is attached to the electric power tool by fixing the bit holder to the drive shaft of the electric power tool. The electric power tool has a chuck at a far end of the drive shaft and the chuck is usually designed to hold various types of drill bits. Accordingly, as long as the drive shaft is of a type to which the bit holder of the circular hole cutting device can be attached, it is possible to connect the circular hole cutting device to practically any electric power tool regardless of its manufacturer or type, so that the circular hole cutting device provides great flexibility in application.

The cylindrical attachment (cover) 101 of the earlier-mentioned conventional circular hole cutting device 100 is designed to be mounted on a casing of the circular hole cutting device 100, and this casing is made in different shapes depending on its manufacturer and type. Therefore, the cover designed to fit a specific type of circular hole cutting device can not usually be attached to other circular hole cutting devices and, as a consequence, the conventional circular hole cutting device 100 can only be used with only the specified type of circular hole cutting device, providing extremely low flexibility in use. In contrast, the aforementioned circular hole cutting device of the invention is not associated with such inconvenience because it is constructed such that the bit holder is attached to the drive shaft of the electric power tool.

Furthermore, since the relatively rotatable part and the bit holder are connected relatively rotatably with each other, the relatively rotatable part does not rotate together with the drive shaft of the electric power tool even when the relatively rotatable part is turned about the pivot shaft. Accordingly, it is not necessary for an operator to turn the circular hole cutting device about its own axis when making a hole in a ceiling, for instance. This would help increase labor efficiency in hole-cutting operation.

In the aforementioned circular hole cutting device of the invention, the relatively rotatable part may have a contact portion which goes into contact with a surface to be worked of the object. This construction would further facilitates the hole-cutting operation since fluctuation of the relatively rotatable part is avoided when its contact portion is kept in close contact with the surface of the object.

The relatively rotatable part may be constructed such that the position of its contact portion can be adjusted in an axial direction. This would make it easier to set the bit to a position where it passes through the object when the contact portion of the relatively rotatable part goes in contact with the object because the position of the contact portion can be easily adjusted. As a result, it becomes possible to make a hole according to the thickness of the object to be worked in an easy and reliable way.

In the circular hole cutting device of the invention, a cavity which receives chips cut by the bit may be formed in the relatively rotatable part. Since the cavity of the relatively rotatable part captures the chips cut by the bit during the hole-cutting operation, the chips would not fall on the operator and this serves to greatly improve work environment.

According to the invention, the relatively rotatable part may be provided with a radial member which extends parallel to a radial direction of the bit and has the pivot shaft at a far end. With this arrangement, if the pivot shaft of the radial member is inserted into the center hole formed in the object before forming the desired circular hole in the object, it becomes possible to turn the circular hole cutting device about the center hole in a stable and reliable fashion and to easily make the circular hole whose radius is equal to the effective length of the radial member, or the distance between the bit and the pivot shaft.

In this case, the radial member may be constructed to allow adjustment of the distance (effective length) from its pivot shaft to the bit. This makes it possible to form a circular hole having a desired diameter in the object.

Alternatively, the relatively rotatable part may be provided with a plurality of radial members each of which extends parallel to a radial direction of the bit when fitted to the relatively rotatable part and has the pivot shaft at a far end, the radial members allowing a choice of different distances from the pivot shaft to the bit. This allows the operator to select a radial member whose effective length is suited for the radius of the circular hole to be formed in the object. The radial rods having the fixed effective lengths may be supplied as accessories to the circular hole cutting device.

According to the invention, a bearing may be fitted between the bit holder and the relatively rotatable part. With this provision, even when the bit holder is turned at a high speed by the electric power tool for cutting the circular hole in the object, the bearing placed between the bit holder and the relatively rotatable part enables them to turn smoothly relative to each other, thereby avoiding such an undesirable phenomenon that the bit holder and the relatively rotatable part turn together with each other.

In the aforementioned relatively rotatable part having the cavity and the radial member, the pivot shaft of the radial member can not be retracted into the cavity since the pivot shaft is obstructed by a wall of the relatively rotatable part surrounding its cavity. The pivot shaft should therefore be located outside the relatively rotatable part and, as a consequence, the diameter of the circular hole cut in the object can not be made smaller than the diameter of the cavity. The invention overcomes this inconvenience by the following arrangement.

A circular hole cutting device in another form of the invention which makes a circular hole in an object when turned about a center hole formed in the object comprises a bit holder which can be attached to a drive shaft of an electric power tool in such a way that the bit holder with a bit attached to a far end rotates together with the drive shaft on a common axis, and a relatively rotatable part fitted to the bit holder relatively rotatably about the axis of the drive shaft, wherein the relatively rotatable part includes a cover having a peripheral wall and an internal cavity which captures chips cut by the bit and a radial member fitted to the cover, wherein the radial member has at its far end the pivot shaft extending parallel to the bit and is fitted to the cover in such a way that the distance from the pivot shaft to the bit can be adjusted, and wherein a cutout which makes it possible to retract the pivot shaft into the cavity of the cover is formed in its peripheral wall.

This construction makes it possible to retract the pivot shaft into the cavity of the relatively rotatable part by pulling the radial member in such a way that the pivot shaft passes through the cutout in the cover, so that the pivot shaft can be located on either the outside or inside of the cavity. As a result, it becomes possible to cut a circular hole having a diameter either larger or smaller than diameter of the cavity using the circular hole cutting device. This would further enhance the flexibility of the circular hole cutting device.

The cover may include a first cylindrical part in which the cavity and the cutout are formed and a second cylindrical part which is detachably fitted to the first cylindrical part in such a way that the second cylindrical part covers at least part of the cutout. In this construction, the effective length of the radial member can be adjusted with the second cylindrical part removed from the first cylindrical part. If the second cylindrical part is then mounted on the first cylindrical part, the cutout in the first cylindrical part is covered by the second cylindrical part regardless of whether the pivot shaft is located on the outside or inside of the cavity, so that chips produced during the hole-cutting operation and captured by the cavity in the cover are prevented from falling through the cutout.

The second cylindrical part may have a contact portion which goes into contact with a surface to be worked of the object, and may be mounted on the first cylindrical part such that the position of the contact portion can be adjusted in an axial direction. This construction makes it possible to adjust the amount of projection of the second cylindrical part from the first cylindrical part according to the thickness of the object such that the bit passes through the object. As a result, it becomes possible to make a hole in an easy and reliable way.

This application is based on Japanese application serial no. JP2000-41598 filed on Feb. 18, 2000 and Japanese application serial no. JP2000-219284 filed on Jul. 19, 2000, the contents of which are hereby incorporated by reference.

Although the present invention has been fully described by way of examples with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A circular hole cutting device for cutting a circular hole in an object, said circular hole cutting device comprising:
a bit holder attachable with a drive shaft of an electric power tool for detachably holding a bit to rotate the bit together with the drive shaft on a common axis; and
a relatively rotatable part fitted to the bit holder and being relatively rotatable about the axis of the drive shaft, the relatively rotatable part having a pivot shaft which is located at a position offset from the bit in its radial direction and can be inserted into a center hole formed by the bit,
wherein said relatively rotatable part includes a cover having a peripheral wall and an internal cavity which receives chips cut by said bit and a radial member fitted to the cover, wherein said radial member has at its far end said pivot shaft extending parallel to said bit and is fitted to the cover in such a way that the distance from the pivot shaft to the bit can be adjusted, and said peripheral wall is formed with a cutout which makes it possible to retract the pivot shaft into the cavity of the cover.

2. A circular hole cutting device according to claim 1, wherein said relatively rotatable part has a contact portion which goes into contact with a surface to be worked of the object.

3. A circular hole cutting device according to claim 2, wherein said relatively rotatable part is constructed such that the position of its contact portion can be adjusted in an axial direction.

4. A circular hole cutting device according to claim 1, wherein said cover includes a first cylindrical part in which said cavity and said cutout are formed and a second cylindrical part which is detachably fitted to the first cylindrical part in such a way that the second cylindrical part covers at least part of said cutout.

5. A circular hole cutting device according to claim 1, wherein said relatively rotatable part is provided with said radial member which extends parallel to a radial direction of said bit and has said pivot shaft at a far end.

6. A circular hole cutting device according to claim 5, wherein said radial member is constructed to allow adjustment of the distance from its pivot shaft to the bit.

7. A circular hole cutting device according to claim 1, wherein said relatively rotatable part is provided with a plurality of radial members each of which extends parallel to a radial direction of said bit when fitted to said relatively rotatable part and has said pivot shaft at a far end, said radial members allowing a choice of different distances from the pivot shaft to the bit.

8. A circular hole cutting device according to claim 1, further comprising a bearing which is fitted between said bit holder and said relatively rotatable part.

9. A circular hole cutting device according to claim 4, wherein said second cylindrical part has a contact portion which goes into contact with a surface to be worked of the object, and is mounted on the first cylindrical part such that the position of the contact portion can be adjusted in an axial direction.

* * * * *